(12) United States Patent
Gustafson et al.

(10) Patent No.: US 7,448,026 B1
(45) Date of Patent: Nov. 4, 2008

(54) METHOD AND APPARATUS FOR ACCURACY-AWARE ANALYSIS

(75) Inventors: John L. Gustafson, Cupertino, CA (US); Phyllis E. Gustafson, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 784 days.

(21) Appl. No.: 10/784,753

(22) Filed: Feb. 23, 2004

(51) Int. Cl.
*G06F 9/44* (2006.01)
(52) U.S. Cl. .................. 717/130; 717/127; 717/128; 708/495
(58) Field of Classification Search ............ 717/127, 717/128, 130; 708/495
See application file for complete search history.

(56) References Cited

U.S. PATENT DOCUMENTS

| 6,085,029 A * | 7/2000 | Kolawa et al. ............ 714/38 |
| 6,769,115 B1 * | 7/2004 | Oldman .................. 717/126 |
| 2005/0091645 A1 * | 4/2005 | Chilimbi et al. ........... 717/130 |

OTHER PUBLICATIONS

Aberth et al., Precise Computation Using Range Arithmetic, via C++, AVM Transaction on Mathematical Software, vol. 19, No. 4, Dec. 1992, pp. 481-491.*

W. Kahan, Lecture Notes on the Status of IEEE Standard 754 for Binary Floating-Point Arithmetic, [Retrieved online]<http://www.cs.berkeley.edu/~wkahan/ieee754status/IEEE754.PDF>, Oct. 1997, p. 1-30.*

Stolfi et al., Self-Validated Numerical Methods and Application, chapter 1 Introduction, May 1997, p. 1-13.*

IEEE 754 floating-point test software, Dec. 2003, {Retrieved online] <http://web.archive.org/web/20031204150126/http://www/math.utah.edu/~beebe/software> pp. 1-16.*

Fang Et al., "Floating-Point Error Analysis Based on Affine Arithmetic", IEEE 2003, pp. 561-564.*

David Goldberg, "What Every Computer Scientist Should Know About Floating-Point Arithmetic", ACN Computering Surveys. vol. 23, No. 1, Mar. 1991, pp. 1-48.*

* cited by examiner

*Primary Examiner*—Tuan Q. Dam
*Assistant Examiner*—Zheng Wei
(74) *Attorney, Agent, or Firm*—Osha•Liang LLP

(57) ABSTRACT

A method for accuracy-aware analysis of a program involving obtaining source code for the program comprising a floating point variable, instrumenting the source code to associate an accuracy-aware tracking structure with the floating-point variable to obtain instrumented source code, compiling to instrumented source code to obtain instrumented compiled code, and executing the instrumented compiled code, wherein executing the instrumented compiled code comprises using the accuracy-aware tracking structure to track an operation on the floating-point variable.

20 Claims, 3 Drawing Sheets

METHOD AND APPARATUS FOR ACCURACY-AWARE ANALYSIS

BACKGROUND

In general, floating-point notation represents a number in the form $\pm 0.ddd \ldots d \times b^e$, where b is a base, each d is a digit from 0 to b−1, and e is an integer exponent. The digits (d) are collectively referred to as a mantissa. The number of digits in the mantissa is typically fixed for a particular floating-point representation. For example, in the most common current form of floating-point representation (i.e., Institute of Electrical and Electronics Engineers (IEEE) 754 binary standard), the base (b) is 2, the exponent (e) ranges from −1023 to +1024 (represented using 11 bits), and the mantissa is represented using 53 bits (including a bit for the sign of the number).

Numbers are represented in floating-point notation in a wide variety of computer applications. Specifically, programmers represent numbers in floating-point notation when the accuracy of the number is important for the particular application. However, a programmer's reliance on the accuracy of a given number in floating-point notation may be unfounded. In many cases, simple arithmetic operations such as addition, subtraction, multiplication, etc. introduce accuracy loss that is often hard to detect, and yet is important to understand. For example, the addition of ½ to one million one thousand times, is $0.1000500 \times 10^7$. In a system with seven decimals of precision, due to rounding of the intermediate result after each addition of ½, the result is typically represented as $0.1000000 \times 10^7$. Depending on what this particular number, represented in floating-point notation, is to be used for, a difference of five hundred may be significant. Accordingly, it is desirable to have an understanding of the accuracy of the number represented in the mantissa, when the number is used in a computer application.

One conventional approach to determine the accuracy of a number represented in floating-point notation uses interval arithmetic (IA). Using this method, numbers represented using floating-point notation are replaced with intervals that bound the result (final or intermediate) when the number cannot be expressed exactly by the computer application (i.e., the number of mantissa bits required to represented the number exceeds the number of mantissa bits available to represent the number, e.g., a number requires nine bits to be exactly represented but the mantissa in the given floating-point representation is only allocated seven bits).

Accordingly, IA provides a means to indicate to the programmer whether the given number, represented in floating-point notation, is exact or inexact. However, IA typically provides no information about the cause of the inaccuracy or inability of the computer program to accurately represent the result in floating-point notation. In addition, IA typically requires low level-access to the rounding modes of the processor upon which the computer application is running.

A second conventional approach to determine the accuracy of a number represented in floating-point notation modifies the level of precision in the processor executing the computer application and determines whether the change in precision (e.g., from 14 decimals in the mantissa to 11 decimals in the mantissa) has an effect on the accuracy of the results. This approach provides a means to identify whether a given result is exact or inexact, as well as to determine, what level of precision is required to represent the result. However, this approach does not typically provide any information as to the cause of the inaccuracy of the results.

SUMMARY

In general, in one aspect, the invention relates to a method for accuracy-aware analysis of a program comprising obtaining source code for the program comprising a floating point variable, instrumenting the source code to associate an accuracy-aware tracking structure with the floating-point variable to obtain instrumented source code, compiling to instrumented source code to obtain instrumented compiled code, and executing the instrumented compiled code, wherein executing the instrumented compiled code comprises using the accuracy-aware tracking structure to track an operation on the floating-point variable.

In general, in one aspect, the invention relates to A system for performing accuracy-aware analysis on a program, comprising a source code defining the program comprising a floating point variable, a preprocessor configured to instrument the source code, wherein instrumented source code comprises an accuracy-aware tracking structure associated with the floating-point variable, a runtime utility configured to track an operation of the floating-point variable and update the accuracy-aware tracking structure associated with the floating-point variable, and a runtime environment configured to execute the instrumented source code and the runtime utility.

In general, in one aspect, the invention relates to A computer system for performing accuracy-aware analysis on a program, comprising a processor, a memory, a storage device, and software instructions stored in the memory for enabling the computer system under control of the processor, to obtain source code for the program comprising a floating point variable, instrument the source code to associate an accuracy-aware tracking structure with the floating-point variable to obtain instrumented source code, compile to instrumented source code to obtain instrumented compiled code, and execute the instrumented compiled code, wherein executing the instrumented compiled code comprises using the accuracy-aware tracking structure to track an operation on the floating-point variable.

Other aspects and advantages of the invention will be apparent from the following description and the appended claims.

DETAILED DESCRIPTION

Figure 1:
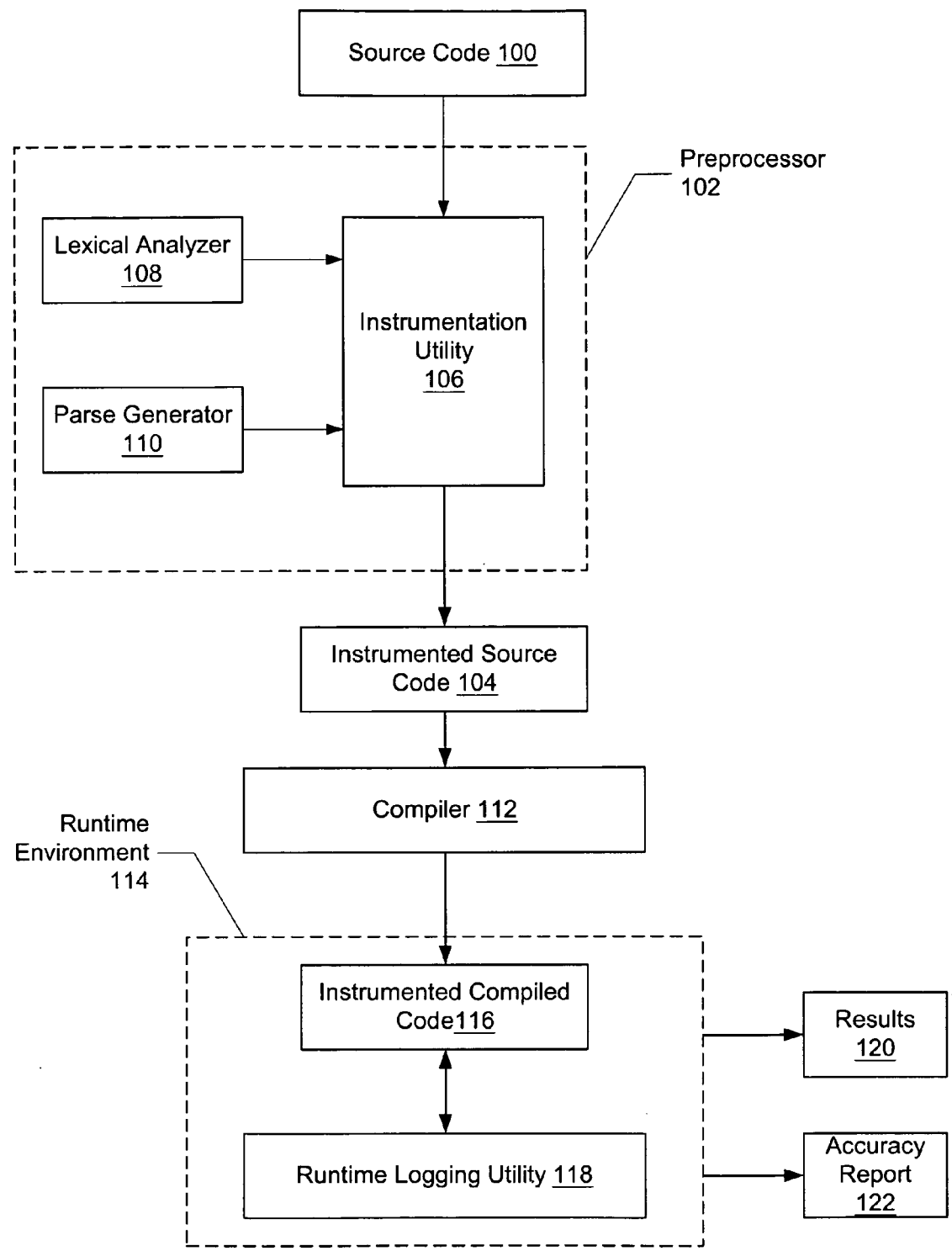
FIG. 1 shows a flow diagram in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for accuracy-aware analysis. More specifically, embodiments of the invention provide a means to track operations performed on number a represented in floating-point notation and identify accuracy loss due to the operations within a given computer application. Embodiments of the invention also provide a means to modify the source code of the computer application to include functionality to track operations performed on number a represented in floating-point notation and identify accuracy loss due to the operations within a given computer application.

FIG. 1 shows a flow diagram in accordance with one embodiment of the invention. Initially, source code (100), typically in a high-level language (e.g., Java™ (Java™ is a trademark of Sun Microsystems, Inc.), Fortran, C, C++, etc.) is preprocessed in a preprocessor (102) to produce instrumented source code (104). The instrumented source code (104) is functionally identical to the source code (100); however, the instrumented source code (104) has been augmented to associate an accuracy-aware tracking structure for each number represented in floating-point notation (i.e., a floating-point variable).

In one embodiment of the invention, the accuracy-aware tracking structure records whether the variable is exact or inexact, and if the variable is inexact indicates where the uncertainty (e.g., at which bit in the mantissa) of the floating-point variable begins. In addition, the accuracy-aware tracking structure may record the history of operations that have been performed on the floating-point variable. The history of operations may include the number of multiplication operations, the number of division operations, the number of square root operations, number of addition operations, number of subtraction operations, etc. Also, the accuracy-aware tracking structure may also record the number of left-digit destructions due to renormalization, number of scaled mantissa digits (described below), etc.

In one embodiment of the invention, the accuracy-aware tracking structure may be implemented as a multi-dimensional array indexed by floating-point variable. Alternatively, the accuracy-aware tracking structure may be implemented as a record (such as a struct in C). Further, in one embodiment of the invention, each element in an array of floating-point variables may be associated with a unique accuracy-aware tracking structure. Those skilled in the art will appreciate that the accuracy-aware data structure may be implemented using any type of data structure that can store the aforementioned information.

Continuing with the discussion of FIG. 1, the preprocessor (102), in one embodiment of the invention, includes an instrumentation utility (106). The instrumentation utility (106) typically includes functionality to associate each floating-point variable in the source code (100) with an accuracy-aware tracking structure. The instrumentation utility (106) typically uses a lexical analyzer (108) to parse the source code (100) to obtain tokens, and a parse generator (110) to identify a sequence of tokens. Upon identification of the sequence of tokens, the instrumentation utility (106) inserts the appropriate code into the source code (100).

In general, the code inserted into the source code (100) functions as a hook to record the occurrence of certain events within the source code (100). More specifically, in one embodiment of the invention, the code inserted within the source code (100) may include functionality to call into a runtime logging utility (118) (described below), functionality to associate an accuracy-aware tracking structure with a floating-point variable, functionality to update the accuracy-aware tracking structure associated with the floating-point variable after an operation has been performed on the floating point variable, etc. Those skilled in the art will appreciate that while the instrumentation utility (106) has been described as inserting code into the source code (100), the instrumentation utility (106) may also include functionality to modify the source code (100), as opposed to strictly inserting code.

Once the instrumented source code (104) has been generated, the instrumented source code (104) is compiled, via a compiler (112), to generate instrumented compiled code (116). The compiler (112) typically links the instrumented source code (104) with the necessary libraries to support the functionality of the code inserted into the source code (100) to generate the instrumented source code (104). For example, in some embodiments of the invention, the instrumented source code (104) may include calls into the runtime logging utility (118) (described below). Thus, when the instrumented source code (104) is compiled, the compiler (112) links the libraries associated with the runtime logging utility (118) with the instrumented compiled code (116).

The instrumented compiled code (116) is subsequently executed in a runtime environment (114), for example in a Java™ Virtual Machine. The runtime environment (114) typically includes functionality to execute the instrumented compiled code (116) as well as the functionality to implement additional utilities linked to the instrumented compiled code (116). For example, the runtime environment (114) may concurrently execute a runtime logging utility (118). In one embodiment of the invention, the runtime logging utility (118) includes functionality to maintain the accuracy-aware tracking structure and functionality to update the accuracy-aware tracking structure associated with a given floating-point variable after an operation has been performed on the floating-point variable.

Further, in one embodiment of the invention, the runtime logging utility (118) also includes functionality to perform the necessary operations to update the accuracy-aware data structures (e.g., determine the scaled mantissa (described below)). In addition, the runtime logging utility (118) may also include functionality to generate an accuracy report (122) for one or more floating-point variable within the source code (100). Note that once the instrumented compiled code (116) has finished executing, the runtime environment (114) may also display the results (120) (i.e., values) of the floating-point variables.

Figure 2:
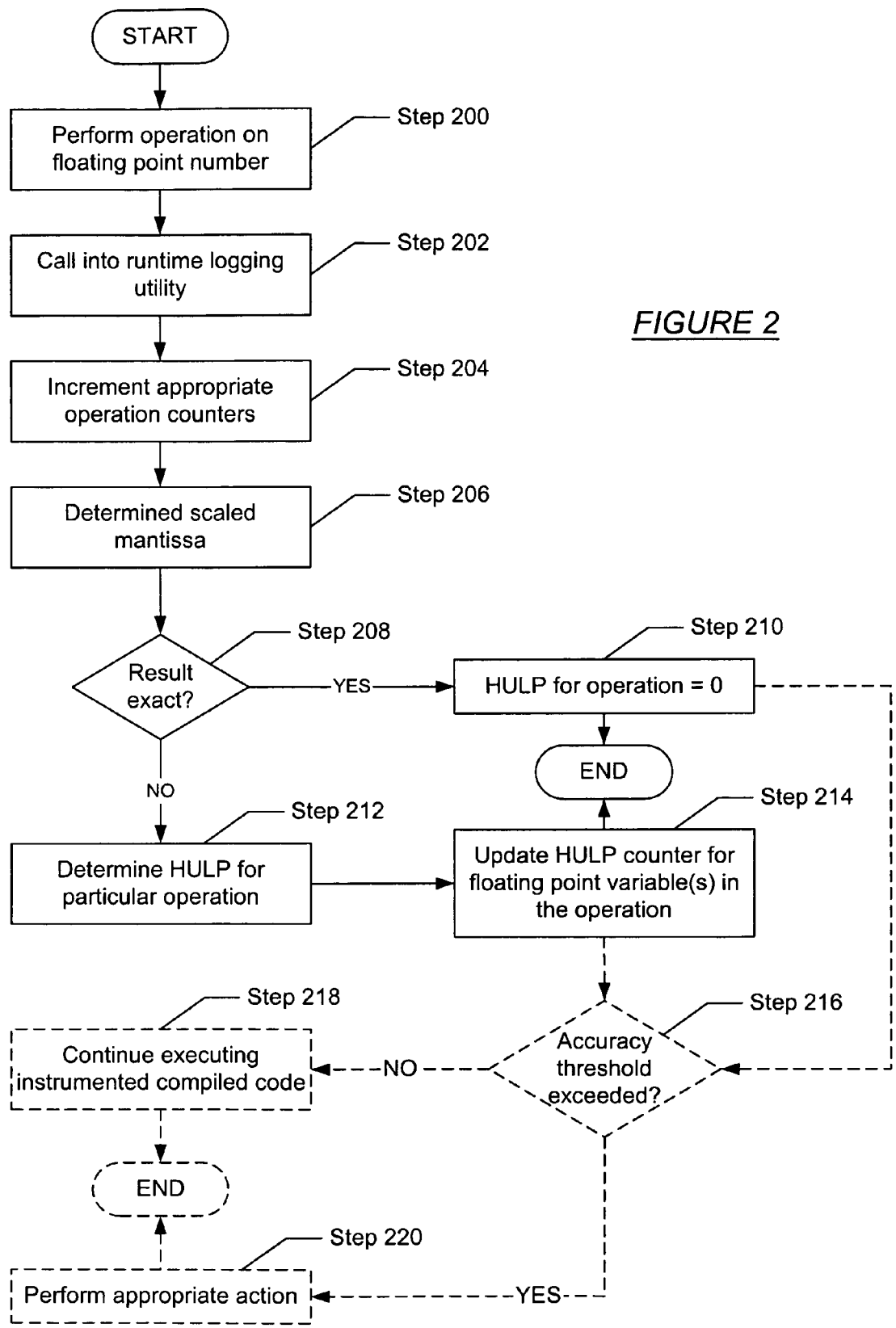
FIG. 2 shows a flowchart in accordance with one embodiment of the invention.

The following discussion details an embodiment of the sequence of events that occur when the instrumented compiled code (116) is executed in the runtime environment (114). FIG. 2 shows a flowchart in accordance with one embodiment of the invention. Specifically, FIG. 2 shows a method for accuracy-aware analysis of a computer program. Initially, an operation of on a floating-point variable is performed (Step 200). A hook, provided by the inserted code, is subsequently triggered that calls into the runtime logging utility (Step 202). The runtime utility subsequently updates the operation counter, within the associated accuracy-aware tracking structure, corresponding to the operation performed on the floating-point variable. For example, if an addition operation was performed on a floating-point variable, then the addition variable would be incremented to indicate the occurrence of the addition operation. Alternatively, depending on whether the operation performed on the floating-point variable included renormalization, a variable tracking additions with renormalization or a variable tracking additions without renormalization may be incremented.

Continuing with FIG. 2, the runtime logging utility subsequently determines a scaled mantissa for each floating-point variable present in the operation (i.e., the operands), as well as the resulting floating point variable (Step 206). The scaled mantissa representation for a floating-point variable corresponds to the integer represented by the first non-zero digit in the mantissa to the last non-zero-digit in the mantissa. Thus, for example, the scaled mantissa for the number $-0.1110010011001000000\times2^{13}$ is $-0.1110010011001$.

Continuing with FIG. 2, the scaled mantissa for the result is subsequently used to determine whether the result is exact or inexact (Step 208). More specifically, if the floating-point variable operands are assumed to be exact, then the result of the operation may be exact or inexact. In one embodiment of the invention, the result is said to be inexact when the correct result, expressed as a scaled mantissa, requires more bits to represent than there are in the mantissa of the format for the result. For example, if a binary format allows a four-bit mantissa, then $(0.1110\times2^3)$ $(0.1010\times2^3)$ is exactly expressible as $0.100011\times2^6$; the scaled mantissa for the result is 110011. Accordingly, because 110011 requires six bits to express but only four bits of mantissa are available, the result is rounded to $0.1001\times2^6$, and marked as inexact.

Inexact results are similarly produced when addition, subtraction, division, or any other mathematical operation on quantities represented as floating-point values produce a result that does not fit in the fixed mantissa size. Note that every high-level language has an operation for finding the remainder of a division, so in the case of a division operation, if the remainder is zero the resulting quotient is exact, otherwise the result is flagged as inexact.

In one embodiment of the invention, the inexact condition is associated with the floating-point variable and stored in the associated accuracy-aware tracking structure. In such cases, the inexact condition may be represented by a one-bit flag. Alternatively, the inexact condition may be associated with the floating-point variable and stored in a temporary memory store that is separate from the accuracy-aware tracking structure and that persists throughout the duration of the execution of the instrumented compiled code.

As an alternative to determining the scaled mantissa, embodiments of the invention using the IEEE 754 standards may use a condition flag incorporated within the standard. Note that the condition flag specified in the IEEE 754 standard requires the runtime logging utility (or a related process) to have access to the "sticky bit" which represents the flag, and functionality to maintain knowledge of the inexact condition after the result has been computed.

Returning to the discussion of FIG. 2, if the result is determined to be exact (Step 206), then the number of half units in last place (HULP) associated with the result is not incremented (Step 210). In one embodiment of the invention, the term HULP is used to record the error caused by rounding the last bit(s) in the mantissa, error introduced by renormalization (typically due to left digit destruction), etc. Thus, the number of HULP associated with a given operation corresponds to the base of the floating-point representation raised to the power of the number of bits causing the error.

For example, consider the subtraction of a first floating-point variable from a second floating point-variable:

$$0.3141593\times10^1$$
$$-0.3140000\times10^1$$
$$=0.0001593\times10^1$$

The result, $0.0001593\times10^1$ is subsequently renormalized to $0.1593000\times10^{-2}$. As shown above, the renormalization of the result destroys the left three zeros after the decimal place, and introduces three zeros to the right of the last non-zero integer in the mantissa. Thus, the number of decimals of error introduced into the results is three, and accordingly, the number of HULP recorded for this operation is $10^3$ or one thousand. The HULP variable in the accuracy-aware tracking structure is subsequently incremented by one thousand. Thus, the invention informs the programmer or user that the result is only accurate to the fourth decimal place. Further, the invention provides the history of operations that caused the inaccuracy. Note that if the number is inexact and no renormalization of the result has occurred, then the number of HULP associated with the operation is the base raised to the power of zero, i.e., the HULP is one.

Those skilled in the art will appreciate that while HULP are described as a means to quantify the error associated with a given number represented in floating-point notation, the invention is not limited to quantifying error using HULP. For example, as an alternative to using HULP to quantify error, the invention may quantify error by using intervals. Consider the following example: If one were to express the exact number 33 as the inexact number $0.3333\times10^2$, the number of HULP would be 1 (assuming a four-decimal mantissa). However, using intervals, the error may be quantified as $0.3333\times10^2 + (0.00003333\times10^2$ to $0.00003334\times10^2)$, where the interval $(0.00003333\times10^2$ to $0.00003334\times10^2)$ is used to quantify the error associated with number represented in floating-point notation.

In one embodiment of the invention, the numbers that make up the interval are stored as two separate variables, i.e., the number corresponding to the upper limit of the interval and the number corresponding to the lower limit of the interval. Further, the numbers that make up the interval may also be represented as floating-point variables. Similar to HULP, intervals may be tracked and updated after every operation on a floating-point number. Additional mechanisms for tracking and quantifying error may also be implemented within the scope of the invention.

Continuing with FIG. 2, those skilled in the art will appreciate that step (204) may not need to be performed if at least one of the operands used to compute the result was inexact. In either case, whether two exact floating-point variables generated an inexact floating-point variable or whether one or more of the operands was inexact, the number of HULP for the particular operation is determined (Step 212).

If the number of mantissa bits required to represent the result exceeds the number of bits allocated to represent the mantissa and no renormalization of the result occurs, then the number of HULP for the operation is one. However, if renormalization of the result occurs, then the number of HULP equals the base raised to the power of the number of zeros added to the mantissa after the last non-zero integer in the result. The HULP counter associated with the floating-point variable containing the result is subsequently updated using the calculated HULP for the renormalization (Step 214).

In one embodiment of the invention, the HULP is represented as an integer. Specifically, the HULP may be represented by an integer of the same word size as the floating-point variable. For example, a 32-bit floating-point variable with a 24-bit mantissa may lose $2^{25}$ HULP before the entire mantissa becomes invalid, and $2^{25}$ fits into a 32-bit integer. Integers of the aforementioned size are typically available in processor designs as a native type, or they are readily maintained with software that extends the precision of the largest integer native type of the system.

At this stage, after the HULP for the operation has been determined and the appropriate HULP counter has been updated, the runtime logging utility may return control back to the instrumented compiled code to continue executing within the runtime environment. However, in some embodiments of the invention, prior to returning to executing the instrumented compiled code, the runtime logging utility (or a related process) determines whether a given accuracy threshold has been exceeded with respect to the result (Step 214). If the accuracy threshold is not exceeded, then the instrumented compiled program continues executing (Step 216). Alternatively, if the accuracy threshold is exceeded, then the runtime logging utility (or a related process) performs the appropriate action as specified by, for example, the user (Step 218). In one embodiment of the invention, the appropriate action to perform is to halt the execution of the instrumented compiled code.

In one embodiment of the invention, the determination of whether the accuracy threshold has been exceeded uses relative error. Alternatively, the determination of whether the accuracy threshold has been exceeded uses absolute error. Furthermore, the determination of whether the accuracy threshold has been exceeded may be that the original program performs a comparison test, (e.g., "if a<b then . . . ") on variables which are so approximate that their ranges of possible values overlap. For example, if a=0.42±0.2, and b=0.43±0.2, then the truth of a<b cannot be determined and may be further used to halt execution.

Consider the following example, $ax^2+bx+c=0$, where the roots are expressible as $x=(-b\pm(b^2-4ac)^{1/2})/(2a)$. The vast majority of today's programmers would program this closed-form expression as written above, using "+" and "−" case of the "±" to give the two roots (or one degenerate root if $b^2-4ac$ is exactly zero.) This approach is hazardous to accuracy, because $(b^2-4ac)^{1/2}$ might be quite close to b, and then $-b+(b^2-4ac)^{1/2}$ would cause destructive cancellation of digits in the result.

Continuing with the above example, suppose a=3, b=100, and c=2, that the values of a, b, and c are exact, and that the mantissa includes 7 digits. A program to solve for the root may then perform the following operations:

| t1 = b * b | $b^2$ | $0.1000000 \times 10^5$ |
|---|---|---|
| t2 = 4 * a | 4a | $0.1200000 \times 10^2$ |
| t2 = t2 * c | 4ac | $0.2400000 \times 10^2$ |
| t2 = t1 − t2 | $b^2 - 4ac$ | $0.9976000 \times 10^4$ |
| if t2 0, then print | Exit if solution is degenerate | |
| "degenerate or | or involves imaginary numbers | |
| non-real answer" | | |
| stop | | |
| end if | | |
| t2 = sqrt(t2) | $(b^2 - 4ac)^{1/2}$ | $0.9987993 \times 10^2$ |
| r1 = −b + t2 | $-b + (b^2 - 4ac)^{1/2}$ | $0.1200700 \times 10^0$ |
| r1 = r1/2 | $(-b + (b^2 - 4ac)^{1/2})/2$ | $0.6003500 \times 10^{-1}$ |
| r1 = r1/a | First root | $0.2001167 \times 10^0$ |

-continued

| r2 = −b − t2 | $-b - (b^2 - 4ac)^{1/2}$ | $-0.1998799 \times 10^3$ |
|---|---|---|
| r2 = r2/2 | | $-0.9993995 \times 10^2$ |
| r2 = r2/a | Second root | $-0.3331332 \times 10^2$ |
| print r1, r2 | | |
| end | | |

The result of executing the above algorithm provides two roots, namely 0.2001167 and −33.31332, to seven decimals. At this stage, there is no indication of the accuracy of the two roots. Using the invention, as described above, the following accuracy report may be generated. The following table shows columns for the number of HULP, the number of Scaled Mantissa digits ("S.M."), the computed value, the number of addition/subtraction operations where the result is not renormalized "±", the number of left digit destructions that require renormalization of the result "ldd", the number of multiplication "*", division "/", and square root " " operations. The number of S.M. digits is not the same as the number of significant digits, so the number 100 may have exactly three significant digits, but only one S.M. digit in a decimal floating-point representation, the scaled mantissa is the mantissa stripped of leading zeros and trailing zeros, without regard for their significance.

| | HULP | S.M. | Value | ± | ldd | * | / |   |
|---|---|---|---|---|---|---|---|---|
| t1 = b * b | 0 | 1 | $0.1000000 \times 10^5$ | 0 | 0 | 1 | 0 | 0 |
| t2 = 4 * a | 0 | 2 | $0.1200000 \times 10^2$ | 0 | 0 | 1 | 0 | 0 |
| t2 = t2 * c | 0 | 2 | $0.2400000 \times 10^2$ | 0 | 0 | 2 | 0 | 0 |
| t2 = t1 − t2 | 0 | 4 | $0.9976000 \times 10^5$ | 1 | 0 | 3 | 0 | 0 |
| if t2 0, then print | | Test is safe; | | | | | | |
| "degenerate or | | no ambiguity | | | | | | |
| non-real answer" | | | | | | | | |
| stop | | | | | | | | |
| end if | | | | | | | | |
| t2 = sqrt(t2) | 1 | 7 | $0.9987993 \times 10^2$ | 1 | 0 | 3 | 0 | 1 |
| r1 = −b + t2 | 100 | 5 | $0.1200700 \times 10^0$ | 1 | 1 | 3 | 0 | 1 |
| r1 = r1/2 | 100 | 5 | $0.6003500 \times 10^{-1}$ | 1 | 1 | 3 | 1 | 1 |
| r1 = r1/a | 101 | 5 | $0.2001167 \times 10^0$ | 1 | 1 | 3 | 2 | 1 |
| r2 = −b − t2 | 2 | 7 | $-0.1998799 \times 10^3$ | 2 | 0 | 3 | 0 | 1 |
| r2 = r2/2 | 3 | 7 | $-0.9993995 \times 10^2$ | 2 | 0 | 3 | 1 | 1 |
| r2 = r2/a | 4 | 7 | $-0.3331332 \times 10^2$ | 2 | 0 | 3 | 2 | 1 |
| print r1, r2 | | | | | | | | |
| end | | | | | | | | |

Upon inspection of the above report, it is clear that the first root (r1) is only accurate to 5 decimal places while the second root (r2) is accurate to 7 decimal places.

| r1 = r1/a | 101 | 5 | $0.2001167 \times 10^0$ | 1 1 3 2 1 |
|---|---|---|---|---|
| . . . | | | | |
| r2 = r2/a | 4 | 7 | $-0.3331332 \times 10^2$ | 2 0 3 2 1 |

Referring to the above report, the annotations indicate that the r1 computation involved a destructive subtraction (ldd=1), whereas the r2 computation did not (ldd=0). Specifically, the r1 computation involved adding −100 to +99.87993, after which the result was renormalized by shifting the result left two decimal places. That renormalization incremented the ldd counter by 1 and the corresponding HULP counter by 100.

Using the above annotations, the programmer may reformulate the algorithm to avoid the destructive subtraction. For example, the following modification to the above algorithm may restore the accuracy of r1: Compute r2 first, then compute r1=c/(a*r2). Note that in one embodiment of the invention the annotations indicate where reformulations are needed. In addition, the annotations may also suggest to the programmer to use interval arithmetic for containing the error or to use higher-precision variables for part of the computation. Those skilled in the art will appreciate that the above example was intended to illustrate the operation of the invention, but was not intended to limit the scope of the invention.

In one embodiment of the invention, the invention may be used to determine locations within the source code where using a lower level of precision would still produce accurate results. For example, the invention may be used to identify locations in the code where 32-bit floating-point arithmetic could be used to store temporary values without affecting the accuracy of the final result that in other places relies on 64-bit floating-point arithmetic. This type of optimization may be used to effectively reduce both the storage and bandwidth requirements for a given algorithm at no penalty to the user. Further, if the invention provides enough confidence that the lower precision is safe for the range of the possible data inputs in an a given computer application, then a computer application may be modified to calculate results at a faster rate while using less memory resources to store the floating-point variables without reducing the accuracy of the numerical results.

Those skilled in the art will appreciate that the invention may be implemented on any high level language, e.g., Java™, Fortran, C, C++, etc., that supports the use of floating-point calculations. Further, the invention typically does not require any extension to the high level language, and typically does not violate any security or portability specifications. Further, those skilled in the art will appreciate that while the invention has been described using a given floating-point representation, the invention may be implemented using any floating-point representation.

Figure 3:
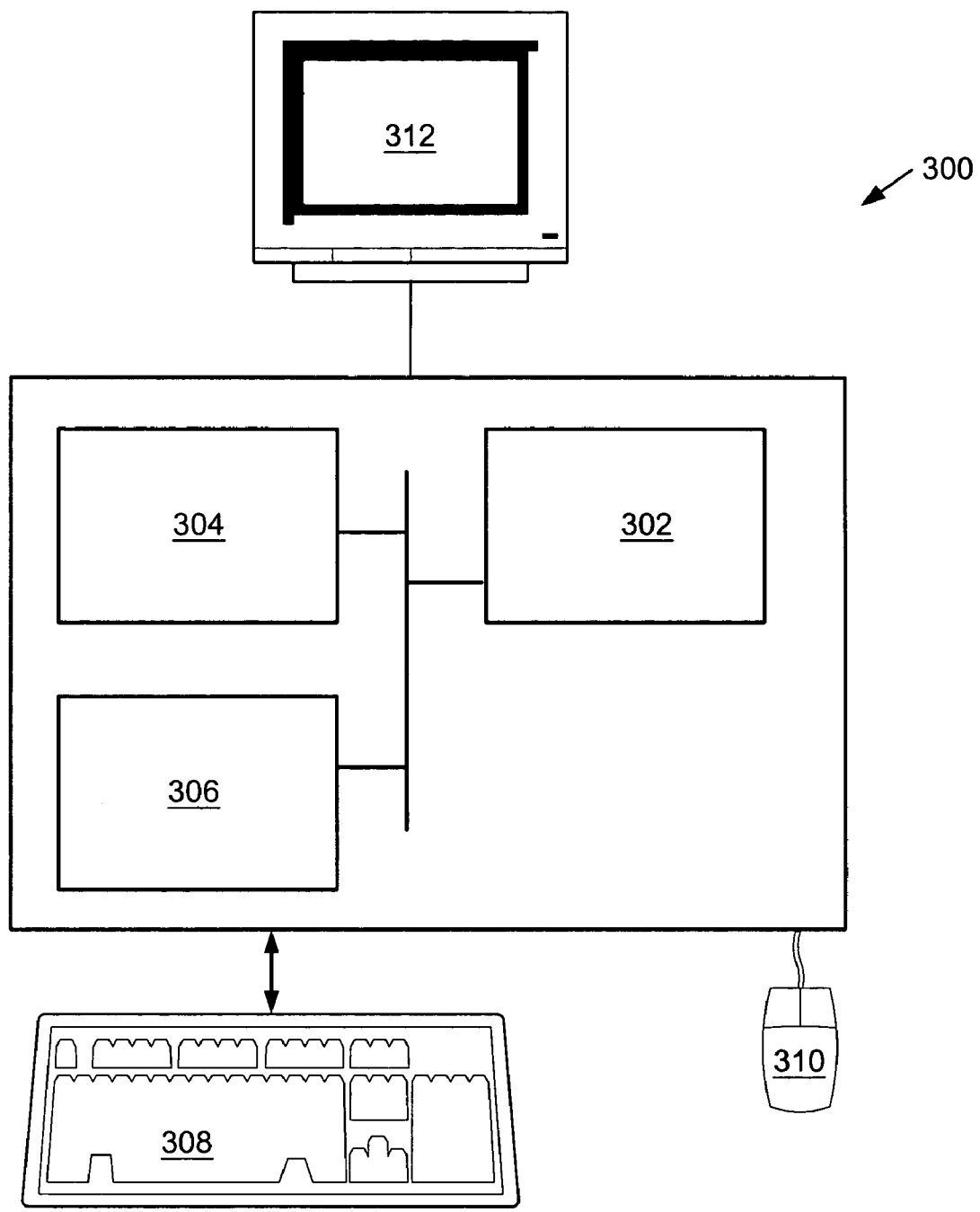
FIG. 3 shows a computer system in accordance with one embodiment of the invention.

The invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (300) may be located at a remote location and connected to the other elements over a network.

In one or more embodiments of the invention, a means to readily automate a given program to track operations performed on numbers represented in floating-point notation is provided. Also, an indication as to the possible sources of inaccuracy is provided. Further, embodiments of the invention provide a means to pinpoint an operation where accuracy drops precipitously and to notify the programmer of such as occurrence. Embodiments of the invention also provide insight into the type of accuracy loss resulting from small losses of accuracy that accumulate with repetition to affect the results. By tracking operations performed on numbers represented in floating point notation, embodiments of the invention provide a means to increase programmer productivity and decrease the amount of time required to currently find such errors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of accuracy-aware analysis of a program, comprising:
    obtaining source code for the program comprising a floating-point variable;
    instrumenting the source code to associate an accuracy-aware tracking structure with the floating-point variable to obtain instrumented source code with functionality to call a runtime logging utility;
    compiling the instrumented source code to obtain instrumented compiled code;
    executing the instrumented compiled code, wherein executing the instrumented compiled code comprises executing one of a plurality of operations on the floating-point variable to obtain a resultant value for the floating-point variable; and
    executing the runtime logging utility to populate the accuracy-aware tracking structure, wherein for each operation performed on the floating-point variable, the runtime logging utility is configured to:
        increment an operations variable in the accuracy-aware tracking structure corresponding to the operation performed on the floating-point variable,
        determine a scaled mantissa for the resultant value, wherein the scaled mantissa representation for a floating-point variable corresponds to the integer represented by the first non-zero digit in the mantissa to the last non-zero-digit in the mantissa,
        compare the scaled mantissa with the resultant value to determine whether the resultant value is exact,
        quantify an error associated with the resultant value when the resultant value is not exact to obtain the error value associated with the resultant value, wherein the error value is a half unit in last place (HULP) value associated with the floating-point variable, wherein the HULP value is a base of a floating-point representation raised to a power of the number of bits causing the error in the floating-point variable,
        store the resultant value, the scaled mantissa, and the error value when the resultant value is not exact, and
        store the resultant value and the scaled mantissa when the resultant value is exact.

2. The method of claim 1, further comprising:
    generating an accuracy-aware analysis report using the accuracy-aware tracking structure.

3. The method of claim 2, wherein the accuracy-aware analysis report includes at least one selected from the group consisting of the error value, the scaled mantissa, and the resultant value.

4. The method of claim 1, wherein the HULP value is determined using information obtained during renormalization.

5. The method of claim 3, wherein the error value comprises an upper limit interval value or a lower limit interval value.

6. The method of claim 1, wherein the operations variable comprises at least one selected from the group consisting of a multiplication variable, a division variable, and a square root variable.

7. The method of claim 1, wherein the accuracy-aware tracking structure further comprises a renormalization variable which track the number of addition and subtraction operations performed on the floating-point variable that do not involve left digit destruction.

8. The method of claim 1, further comprising:
updating the error value using data obtained from quantifying the error associated with the resultant value, if the resultant value is not exact.

9. The method of claim 1, further comprising:
determining whether the resultant value exceeds an accuracy threshold if the resultant value is not exact.

10. The method of claim 9, wherein execution of the compiled instrumented code halts if the accuracy threshold hold is exceeded.

11. The method of claim 9, wherein the accuracy threshold comprises at least one selected from the group consisting of a relative error threshold, an absolute error threshold, and a comparison test.

12. The method of claim 1, further comprising:
setting an accuracy threshold for the program.

13. The method of claim 1, wherein instrumenting the source code comprises:
parsing the source code to obtain the floating-point variable; and
inserting additional source code to call the runtime logging utility.

14. The method of claim 1, wherein the floating-point variable is double type.

15. A computer system for performing accuracy-aware analysis of a program, comprising:
a processor;
a memory;
a storage device; and
software instructions stored in the memory for enabling the computer system under control of the processor, to:
obtain source code for the program comprising a floating-point variable;
instrument the source code to associate an accuracy-aware tracking structure with the floating-point variable to obtain instrumented source code with functionality to call a runtime logging utility;
compile the instrumented source code to obtain instrumented compiled code;
execute the instrumented compiled code, wherein executing the instrumented compiled code comprises executing one of a plurality of operations on the floating-point variable to obtain a resultant value for the floating-point variable; and
execute the runtime logging utility to populate the accuracy-aware tracking structure, wherein for each operation performed on the floating-point variable, the runtime logging utility is configured to:
increment an operations variable in the accuracy-aware tracking structure corresponding to the operation performed on the floating-point variable,
determine a scaled mantissa for the resultant value, wherein the scaled mantissa representation for a floating-point variable corresponds to the integer represented by the first non-zero digit in the mantissa to the last non-zero-digit in the mantissa,
compare the scaled mantissa with the resultant value to determine whether the resultant value is exact,
quantify an error associated with the resultant value when the resultant value is not exact to obtain the error value associated with the resultant value, wherein the error value is a half unit in last place (HULP) value associated with the floating-point variable, wherein the HULP value is a base of a floating-point representation raised to a power of the number of bits causing the error in the floating-point variable,
store the resultant value, the scaled mantissa, and the error value when the resultant value is not exact, and
store the resultant value and the scaled mantissa when the resultant value is exact.

16. The computer system of claim 15, further comprising software instructions to:
generate an accuracy-aware analysis report using the accuracy-aware tracking structure.

17. The computer system of claim 16, wherein the accuracy-aware analysis report includes at least one selected from the group consisting of the error value, the scaled mantissa, and the resultant value.

18. The computer system of claim 15, wherein the HULP value is determined using information obtained during renormalization.

19. The computer system of claim 15, wherein the operations variable comprises at least one selected from the group consisting of a multiplication variable, a division variable, and a square root variable.

20. The computer system of claim 15, wherein software instructions for instrumenting the source code comprises software instructions to:
parse the source code to obtain the floating-point variable; and
insert additional source code to call the runtime logging utility.

* * * * *